United States Patent
Laffay et al.

(10) Patent No.: US 11,873,763 B2
(45) Date of Patent: Jan. 16, 2024

(54) OPTIMISED DISCHARGE LINE GRID AND OPTIMIZED DISCHARGE VALVE

(71) Applicants: SAFRAN AIRCRAFT ENGINES, Paris (FR); ECOLE CENTRALE DE LYON, Ecully (FR); CENTRE NATIONAL DE LA RECHERCHE SCIENTIFIQUE, Paris (FR); UNIVERSITE CLAUDE BERNARD LYON I, Villeurbanne (FR)

(72) Inventors: Paul Clément Guillaume Laffay, Moissy-Cramayel (FR); Fernando Gea Aguilera, Moissy-Cramayel (FR); Josselin David Florian Regnard, Moissy-Cramayel (FR); Marc Cornelius Jacob, Lyons (FR); Stéphane Moreau, Québec (CA)

(73) Assignees: SAFRAN AIRCRAFT ENGINES, Paris (FR); ECOLE CENTRALE DE LYON, Ecole Centrale de Lyon (FR); CENTRE NATIONAL DE LA RECHERCHE SCIENTIFIQUE, Paris (FR); UNIVERSITE CLAUDE BERNARD LYON I, Villeurbanne (FR)

( * ) Notice: Subject to any disclaimer, the term of this patent is extended or adjusted under 35 U.S.C. 154(b) by 0 days.

(21) Appl. No.: 17/995,817

(22) PCT Filed: Apr. 7, 2021

(86) PCT No.: PCT/FR2021/050614
§ 371 (c)(1),
(2) Date: Oct. 7, 2022

(87) PCT Pub. No.: WO2021/205120
PCT Pub. Date: Oct. 14, 2021

(65) Prior Publication Data
US 2023/0151769 A1    May 18, 2023

(30) Foreign Application Priority Data
Apr. 10, 2020   (FR) .................... 2003663

(51) Int. Cl.
F02C 7/24     (2006.01)
F02C 6/08     (2006.01)
F16K 47/08    (2006.01)

(52) U.S. Cl.
CPC .............. F02C 7/24 (2013.01); F02C 6/08 (2013.01); F16K 47/08 (2013.01); *F05D 2260/96* (2013.01)

(58) Field of Classification Search
CPC .... F02C 7/24; F02C 6/08; F16K 47/08; F05D 2260/96; F04D 29/665; F04D 29/664; F04D 29/663
See application file for complete search history.

(56) References Cited

U.S. PATENT DOCUMENTS 4,979,587 A * 12/1990 Hirt ..................... F04D 29/522
                                                                181/269
5,162,620 A    11/1992 Ross et al.
(Continued)

FOREIGN PATENT DOCUMENTS

| FR | 3044705 A1 | 6/2017 |
| WO | 03046358 A1 | 6/2003 |
| WO | 2015110748 A1 | 7/2015 |

OTHER PUBLICATIONS

Vincent Phong, Dimitri papamoschou; Acoustic Transmission Loss of Perforated Plates 18th AIAA/CEAS Aeroacoustics Conference; Jun. 2012.*

(Continued)

*Primary Examiner* — Todd E Manahan
*Assistant Examiner* — Rodolphe Andre Chabreyrie
(74) *Attorney, Agent, or Firm* — Bookoff McAndrews, PLLC

(57) ABSTRACT

An acoustic treatment grid intended to be mounted inside or at the outlet of a duct of a bleed valve of a turbomachine of an aircraft intended to convey a gas flow, the grid comprising a perforated plate and circular orifices traversing the perforated plate along a first direction, the orifices having a diameter and a geometrical center.

Each orifice is separated from an adjacent orifice by a space, the length of which is equal to the product of the diameter of said orifice and a spacing coefficient of a value between 1.1 and 6.

20 Claims, 6 Drawing Sheets

(56) References Cited

U.S. PATENT DOCUMENTS

| | | | | |
|---|---|---|---|---|
| 11,560,968 | B2* | 1/2023 | Pearson | F16K 47/08 |
| 2005/0067218 | A1* | 3/2005 | Bristow | F01D 17/105 |
| | | | | 181/254 |
| 2012/0168248 | A1* | 7/2012 | Burak | F01D 9/041 |
| | | | | 181/292 |
| 2017/0023251 | A1* | 1/2017 | Leparoux | F23R 3/12 |
| 2018/0100440 | A1* | 4/2018 | Moniz | F02C 6/08 |
| 2018/0355878 | A1* | 12/2018 | Regnard | F04D 29/664 |
| 2020/0217272 | A1* | 7/2020 | Gangloff, Jr. | F02K 1/827 |
| 2022/0275941 | A1* | 9/2022 | Leparoux | F02C 7/22 |

OTHER PUBLICATIONS

English Translation of International Search Report issued in International Application No. PCT/FR2021/050614 dated Jul. 19, 2021 (3 pages).

French Search Report issued in French Application No. FR2003663 dated Dec. 9, 2020 (2 pages).

Phong Vincent et al. "Normal incidence acoustic insertion loss of perforated plates with bias flow" The Journal of the Acoustic Society of America, American Institute of the Physics for the Acoustical Society of America, New York, NY, US, vol. 138, No. 6, Dec. 1, 2015 (Dec. 1, 2015), pp. 3907-3921, [retrieved on Jan. 1, 1901] DOI: 10.1121/1.4937602 ISSN: 0001-4966, XP012204061.

* cited by examiner

[Fig. 1]
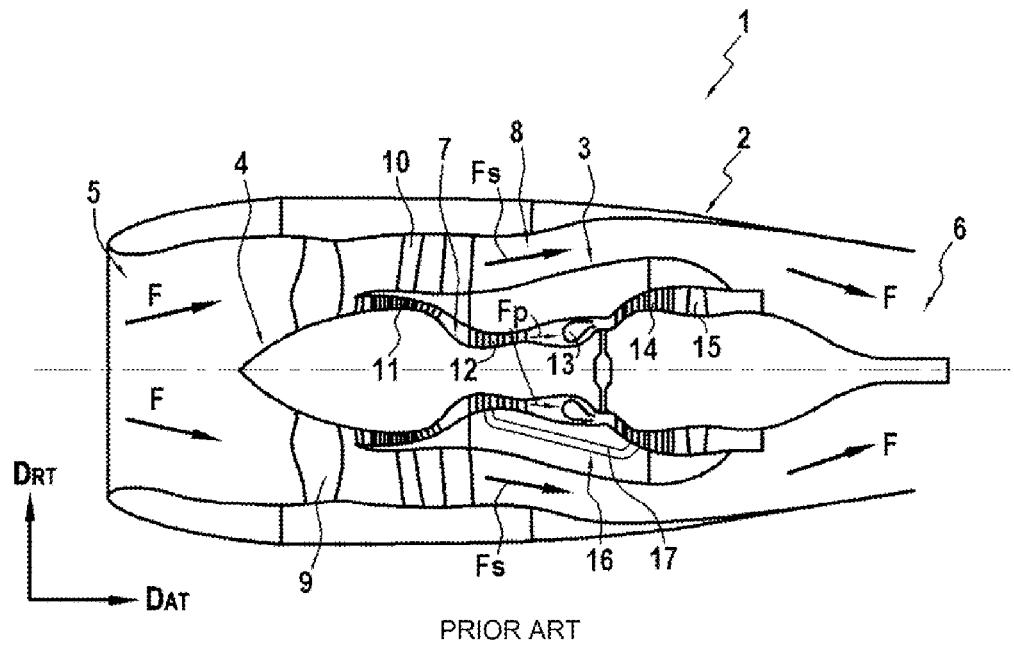
PRIOR ART
[Fig. 2]
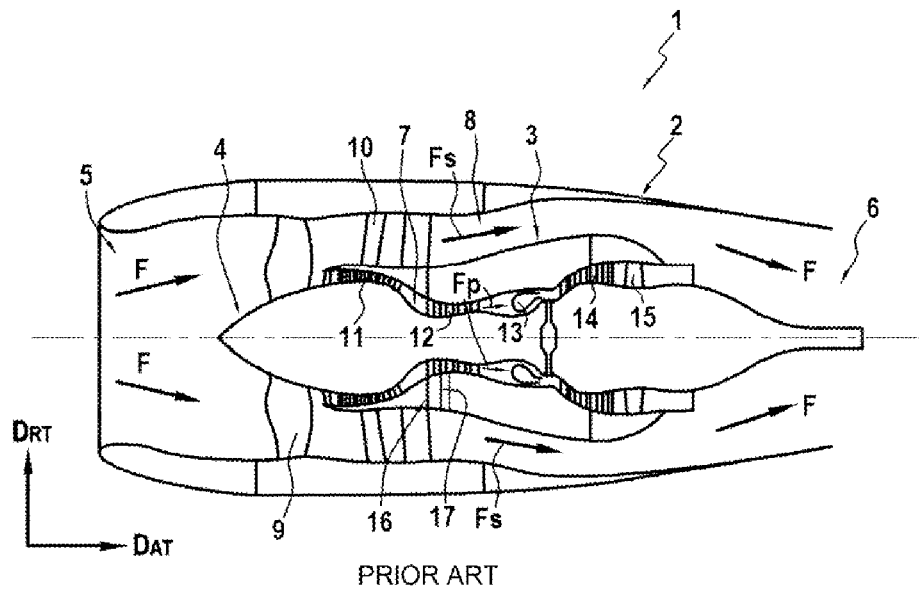
PRIOR ART

[Fig. 3]
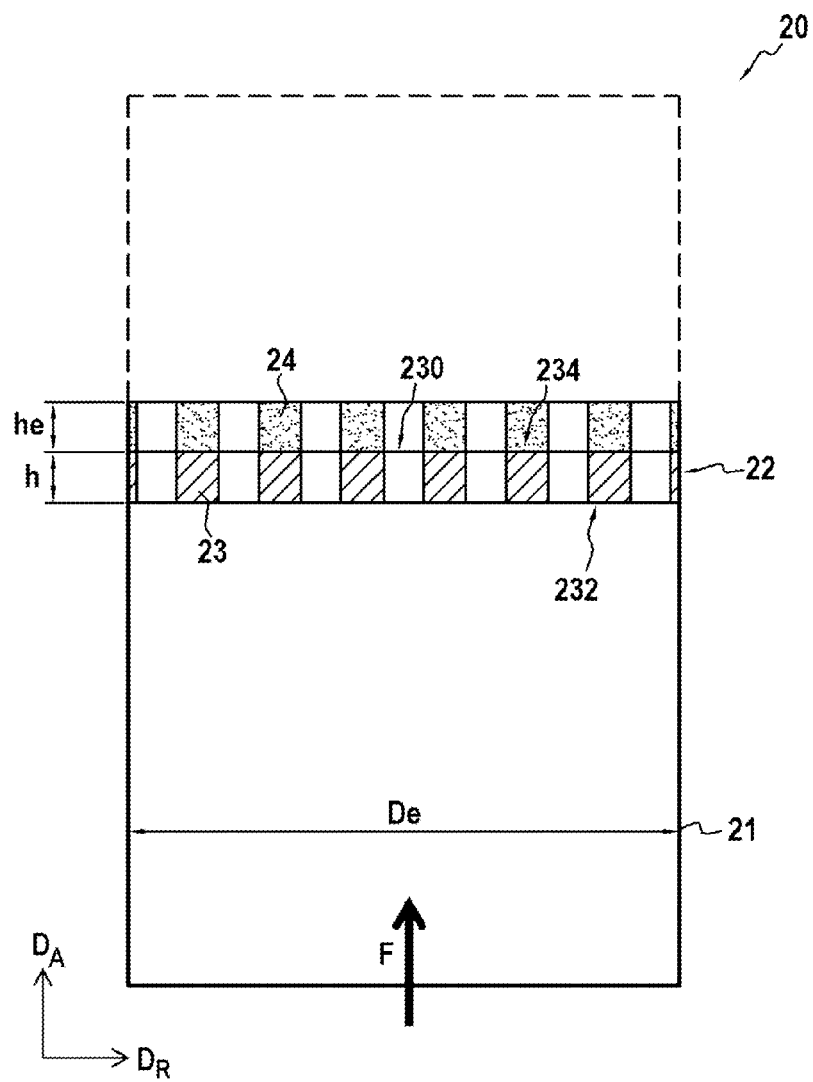

[Fig. 4]
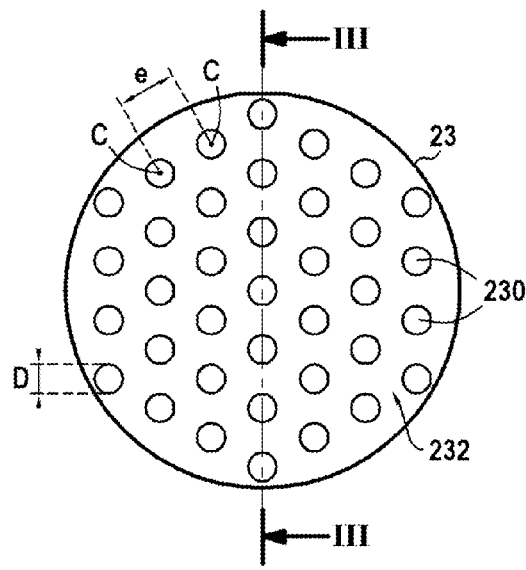
[Fig. 5]
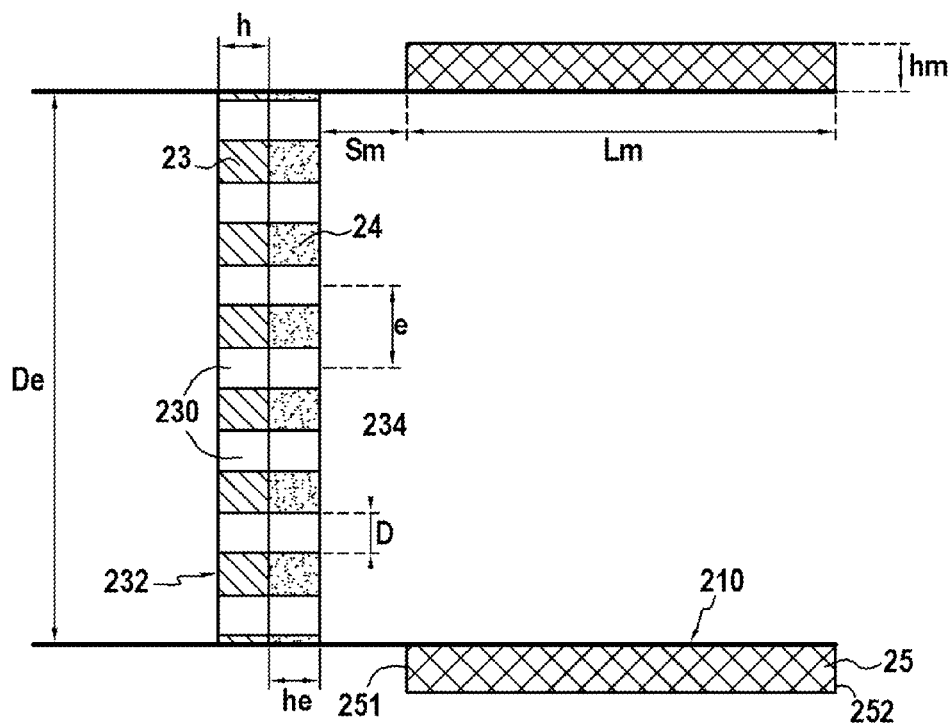

[Fig. 6]
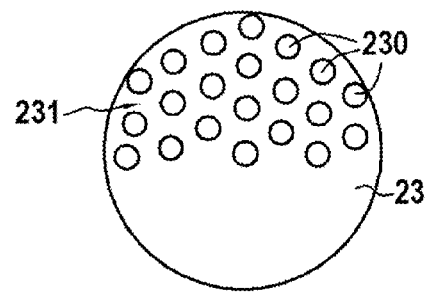
[Fig. 7]
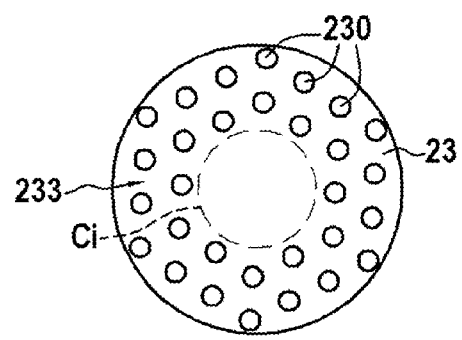
[Fig. 8]
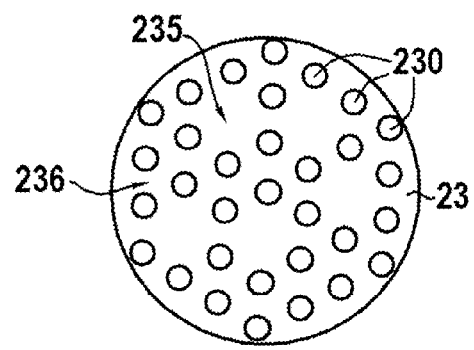

[Fig. 9]
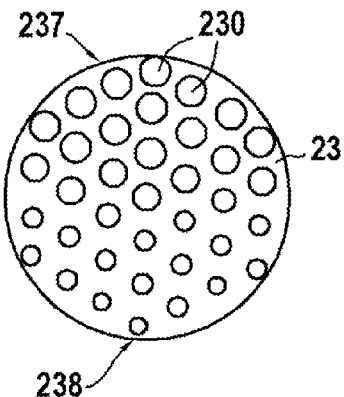
[Fig. 10]
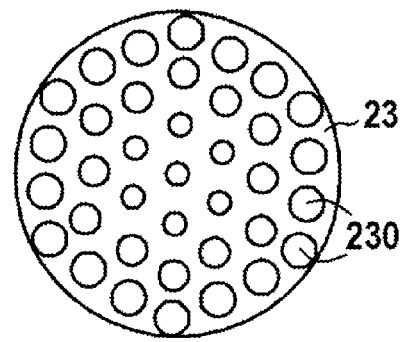
[Fig. 11]
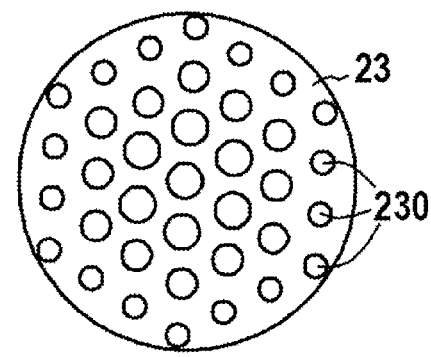

[Fig. 12]
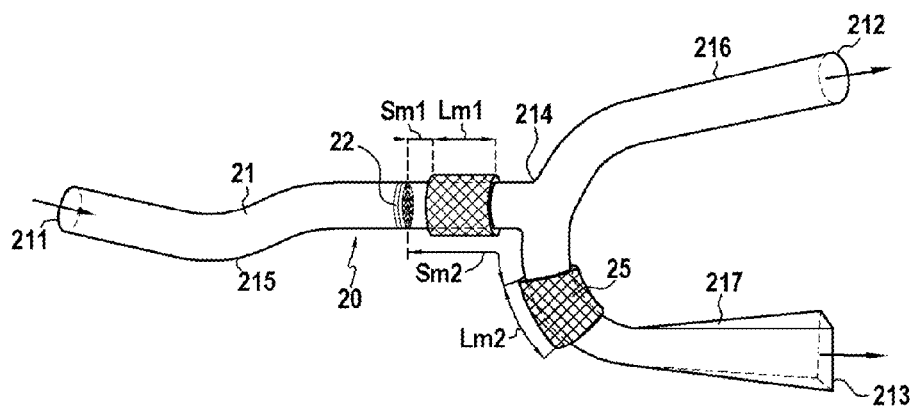
[Fig. 13]
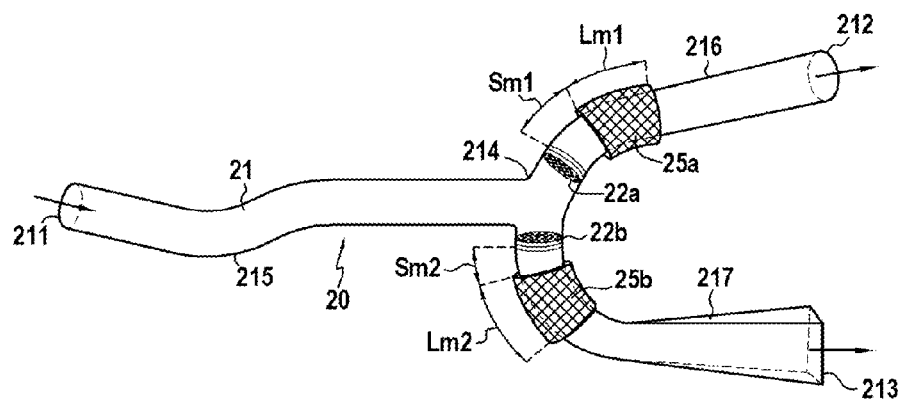

OPTIMISED DISCHARGE LINE GRID AND OPTIMIZED DISCHARGE VALVE

CROSS-REFERENCE TO RELATED APPLICATION(S)

This patent application is a U.S. National Stage entry of International Patent Application No. PCT/FR2021/050614, filed on Apr. 7, 2021, now published as WO 2021/205120 A1, which claims priority to French Application No. FR2003663, filed on Apr. 10, 2020.

TECHNICAL FIELD

The invention relates to the field of noise in aircraft propulsion systems, and specifically noise from bleed valves used on aircraft propulsion systems.

PRIOR ART

In most configurations, aircraft propulsion systems, such as turbofans, turboprops, or open rotors, are constituted in a similar way to the turbojet engine, of which a section view in a longitudinal plane of the turbojet engine is illustrated in FIG. 1.

The turbojet engine 1 comprises a nacelle 2, an intermediate casing 3 and an inner casing 4. The nacelle 2 and the two casings 3 and 4 are coaxial and define an axial direction of the turbojet engine DAT and a radial direction of the turbojet engine $D_{RT}$. The nacelle 2 defines at a first end an inlet channel 5 of a fluid flow and at a second end, opposite the first end, an exhaust channel 6 of a fluid flow. The intermediate casing 3 and the inner casing 4 together delimit a primary fluid flow path 7. The nacelle 2 and the intermediate casing 3 together delimit a secondary fluid flow path 8. The primary flow path 7 and the secondary flow path 8 are disposed along an axial direction of the turbojet engine DAT between the inlet channel 5 and the exhaust channel 6.

The turbojet engine 1 further comprises a fan 9 configured to deliver an air flow F as the fluid flow, the air flow F being divided at the outlet of the fan into a primary flow Fp circulating in the primary flow path 7 and into a secondary flow Fs circulating in the secondary flow path 8.

The secondary flow path 8 comprises a ring of stators 10, and the primary flow path 7 comprises a stage of low-pressure compression 11, a stage of high-pressure compression 12, a combustion chamber 13, a high-pressure turbine 14 and a low-pressure turbine 15.

The propulsion systems of an aircraft generally comprise bleed valves 16 such as for example valves known as Variable Bleed Valves (VBV), Transient Bleed Valves (TBV) or Handling Bleed Valves (HBV). These valves 16 have the function of controlling the operation of the turbojet engines 2, by adjusting the air flow rate at the inlet and/or outlet of the high-pressure compressor 12, to increase the surge margin, at low ratings, or during the acceleration or deceleration phases. The flow rate thus drawn is expelled through a duct 17, then reinserted into the secondary flow path 8 conveying the secondary flow Fs, or further downstream into the primary flow Fp, depending on the strategy used.

If the air flow rate is reinserted downstream of the primary flow path 7 conveying the primary flow Fp as illustrated in FIG. 1 (a commonly-occurring situation in the control of transient ratings), a common system optimization consists in the partial obstruction of the duct by a multi-perforated grid or a diaphragm. The benefit of this optimization is to generate a load loss, making it possible to adapt the thermodynamic conditioning of the flow to the fluid environment into which it will be reinserted, under controlled mass and bulk limitations. The situation in which the grid is positioned in the duct is referred to as a duct configuration.

In the situation illustrated in FIG. 2, in which the air flow rate is reinserted into the secondary flow path 8 conveying the secondary flow Fs, or in the situation in which the air flow rate is reinserted into the ambient environment (a commonly-occurring situation in the control of the lower ratings), the duct 17 of the bleed system is shorter and is conventionally, without a diaphragm. This being the case, it is common to position a grid at the downstream end of this duct 17, to reduce the aero-acoustic phenomena generated by the expulsion of gas at high speed. The situation where the grid is positioned at the end of the duct is referred to as free configuration.

In the two scenarios illustrated in FIGS. 1 and 2, a significant amount of acoustic radiation results from the interaction between the perforated grid and the flow that traverses it. This noise, which can reach a high level on the effective perceived noise scale in decibels, known by the abbreviation EPNdB (Effective Perceived Noise in deciBels) contributes to the airplane noise, during rating transitions and at low ratings.

From the document WO 2015/110748 a strategy is known for reinserting the drawn load, as well as the use of a micro-perforated diaphragm to minimize the acoustic penalties associated with the supersonic phenomena generated downstream of this diaphragm.

Among the noise sources identified during the passing of the flow through the grid, two forms of noise are particularly troublesome: mixing noise, generated as its name suggests by the mixing of the flow in the jets generated by the grid, and shock noise, which can appear when the flow becomes supersonic at the outlet of the grid.

SUMMARY OF THE INVENTION

The invention aims to make provision for an improved grid making it possible to optimize the mixing downstream of the grid and thus minimize the intensity of the aero-acoustic phenomena generated by this type of bleed system and specifically to reduce mixing noise and shock noise, while providing a perforated surface making it possible to ensure the operability of the air system.

In a subject of the invention, provision is made for an acoustic treatment grid intended to be mounted inside or at the outlet of a duct of a bleed valve of a turbomachine of an aircraft intended to convey a gas flow (F), the grid comprising a perforated plate and circular orifices traversing the perforated plate along a first direction, the orifices having a diameter and a geometrical center.

According to a general feature of the invention, each orifice (230) is separated from an adjacent orifice by a space, the length (e) of which is equal to the product of the diameter (D) of said orifice (230) and a spacing coefficient of a value between 1.1 and 6.

The grid according to the invention makes it possible to optimize the spatial distribution of the perforations on the surface of the grid, and thus to limit the interaction of the jets above each perforation of the grid which promotes a quick dissipation of the turbulent structures generated downstream of the grid-flow system, and thus makes it possible to minimize low-frequency noise, while ensuring the operability of the bleed valve.

The acoustic radiation is indeed mainly governed by the expansion of the flow through the grid, and is therefore closely linked to the geometry of the grid. The adjustment of the space of the orifices of the plate as a function of the diameters of the orifices makes it possible to significantly shift the acoustic radiation into the high frequencies and thus take it partially outside the audible range.

Furthermore, since high-frequency radiation is easier to reduce, using porous materials for example, the acoustic absorption of the acoustic radiation is made easier.

The range chosen for the spacing coefficient makes it possible to ensure a good trade-off between the shifting of the radiation into the high frequencies and the various compactness requirements related to the application.

According to a first aspect of the acoustic treatment grid, the diameter of the orifices of the perforated plate is preferably between 0.5 mm and 20 mm.

Such a range of diameters for the orifices of the perforated plate makes it possible to maximize the shifting of the acoustic radiation into the high frequencies.

According to a second aspect of the acoustic treatment grid, the perforated plate preferably has a thickness along the first direction between 1 mm and 20 mm.

The range chosen for the thickness of the perforated plate makes it possible to resist the forces exerted and the temperatures prevailing in the turbomachine in which the bleed valve is mounted including such a bleed grid.

According to a third aspect of the acoustic treatment grid, the perforated plate may comprise, with respect to the gas flow intended to traverse the perforated plate, an upstream face intended to receive the gas flow and a downstream face, opposite the upstream face, from which the gas flow is intended to escape, the grid further comprising a layer of porous material disposed on said downstream face of the perforated plate.

The use of a porous material on the downstream face of the grid makes it possible to attenuate acoustic resonance phenomena in the outlet duct, and thus to reduce the longitudinal modes that are set up.

According to a fourth aspect of the acoustic treatment grid, the layer of porous material disposed on said downstream face of the perforated plate includes a thickness along the first direction preferably between a first thickness equal to half the diameter of an orifice around which the layer of porous material is disposed and a second thickness equal to twenty times the greatest length of the perforated plate measured in a plane orthogonal to the first direction.

Thus, if the perforated plate has the shape of a disc, its thickness is preferably less than twenty times the diameter of the perforated plate.

According to a fifth aspect of the acoustic treatment grid, the perforated plate may comprise between 2 and 500 orifices.

According to a sixth aspect of the acoustic treatment grid, the orifices may be uniformly distributed over the perforated plate.

According to a seventh aspect of the acoustic treatment grid, the perforated plate may comprise at least a first orifice with a first diameter and at least a second orifice with a second diameter separate from the first diameter.

In another subject of the invention, provision is made for a bleed valve for an aircraft turbojet engine comprising a duct intended to convey a gas flow mainly along a first direction from at least one inlet of the duct to at least one outlet of the duct, and at least one acoustic treatment grid as defined above mounted inside the duct or on an outlet of the duct. The first direction of the acoustic treatment grid is colinear with the first direction of the bleed valve.

According to a first aspect of the bleed valve, the duct may comprise at least one wall equipped with an acoustic treatment means and located downstream of the bleed grid with respect to the direction of flow of the gas flow intended to be conveyed through the duct.

The application of an acoustic treatment means on one or more wall(s) of the duct makes it possible to reduce the high-frequency acoustic radiation generated by the expansion of the gas flow through the grid.

According to a second aspect of the bleed valve, the acoustic treatment means of said at least one wall may comprise a layer of porous material and/or an acoustic treatment panel.

The acoustic treatment panel can be a panel comprising a honeycomb structure. The acoustic treatment means can be optimized as a function of the size of the orifices to act on the range of frequencies radiated by said grid.

According to a third aspect of the bleed valve, the shortest distance between the acoustic treatment means and the grid is less than or equal to a length equal to forty times the greatest length of the section of the duct, the section of the duct extending orthogonally to the first direction.

According to a fourth aspect of the bleed valve, the length along the first direction of the acoustic treatment means is preferably between a first length equal to half the greatest length of the section of the duct and a second length equal to fifty times the greatest length of the section of the duct, the section of the duct extending orthogonally to the first direction.

According to a fifth aspect of the bleed valve, the thickness of the acoustic treatment means along a direction orthogonal to the first direction is preferably between a first thickness equal to half the diameter of an orifice of the perforated plate and a second thickness equal to twenty times the greatest length of the section of the duct, the section of the duct extending orthogonally to the first direction.

According to a sixth aspect of the bleed valve, the duct may comprise at least one segment, the diameter of which varies along the first direction.

According to a seventh aspect of the bleed valve, the duct may comprise at least one segment, in which the geometrical shape of the section of the duct varies, the section of the duct extending orthogonally to the first direction.

According to an eighth aspect of the bleed valve, the duct may comprise at least two outlets, at least a fork, at least a first segment extending between the inlet of the duct and a fork, a second segment extending between a fork and a first outlet, a third segment extending between a fork and a second outlet, at least one of said at least one grid being mounted in one of the first, second or third segment, or on one of the first or second outlets.

The use of a duct with a variable section and/or of a non-circular geometrical shape and/or forks makes it possible to minimize any areas of recirculation or stalling of the ducts (source of additional noise) and to adapt the system to the overall dimensions available on the architecture of the engine.

According to a ninth aspect of the bleed valve, said at least one grid and/or said at least one acoustic treatment means can be made of ceramic material.

The advantage of using a ceramic material is that it reduces the weight of the grid by ensuring the resistance of the part to the engine environment (high temperatures etc.)

Furthermore, acoustic treatment made of Ceramic Matric Composite (CMC) material have good properties at high temperatures.

In another subject of the invention, provision is made for a turbojet engine comprising a nacelle, an intermediate casing and an inner casing, coaxial, and a bleed valve as defined above, the intermediate casing and the inner casing together delimiting a primary fluid flow path, the nacelle and the intermediate casing together delimiting a secondary fluid flow path, and the bleed valve being mounted between the primary flow path and the secondary flow path and configured to draw a portion of the air from the primary flow path and deliver it into the secondary air path.

In another subject of the invention, provision is made for a turbojet engine comprising a nacelle, an intermediate casing and an inner casing, coaxial, and a bleed as defined above, the intermediate casing and the inner casing together delimiting a primary fluid flow path in which is mounted a combustion chamber, the nacelle and the intermediate casing together delimiting a secondary fluid flow path, and the bleed valve being configured to draw a portion of the air from the primary flow path upstream of the combustion chamber and deliver it into the primary flow path downstream of the combustion chamber.

BRIEF DESCRIPTION OF THE DRAWINGS

FIG. 1, already described, shows a section view in a longitudinal plane of a turbojet engine of the prior art with a bleed valve reinjecting into the primary flow.

FIG. 2, already described, shows a section view in a longitudinal plane of a turbojet engine of the prior art with a bleed reinjecting into the primary flow.

FIG. 3 schematically shows a section view of a bleed valve fitted with an acoustic treatment grid according to a first embodiment of the bleed valve.

FIG. 4 shows a front view of the acoustic treatment grid of FIG. 3.

FIG. 5 schematically shows a section view of a bleed valve according to a second embodiment of the bleed valve.

FIG. 6 shows a front view of a perforated plate of the acoustic treatment grid according to a third embodiment of the acoustic treatment grid.

FIG. 7 shows a front view of a perforated plate of the acoustic treatment grid according to a fourth embodiment of the acoustic treatment grid.

FIG. 8 shows a front view of a perforated plate of the acoustic treatment grid according to a fifth embodiment of the acoustic treatment grid.

FIG. 9 shows a front view of a perforated plate of the acoustic treatment grid according to a sixth embodiment of the acoustic treatment grid.

FIG. 10 shows a front view of a perforated plate of the acoustic treatment grid according to a seventh embodiment of the acoustic treatment grid.

FIG. 11 shows a front view of a perforated plate of the acoustic treatment grid according to an eighth embodiment of the acoustic treatment grid.

FIG. 12 schematically shows a view of a bleed valve according to a third embodiment of the invention of the bleed valve.

FIG. 13 schematically shows a view of a bleed valve according to a fourth embodiment of the invention of the bleed valve.

DESCRIPTION OF THE EMBODIMENTS

FIG. 3 schematically illustrates a section view of a bleed valve 20 fitted with an acoustic treatment grid 22 according to an embodiment of the invention.

The bleed valve 20 for an aircraft turbojet engine according to the first embodiment of the invention comprises a cylindrical duct 21 with a circular base of a first diameter De and intended to convey a gas flow F, and a grid 22 comprising a perforated plate 23, also cylindrical and comprising orifices 230.

The duct 21 defines an axial direction $D_A$ parallel to the cylindrical axis of symmetry of the duct 21 and a radial direction $D_R$ orthogonal to the axial direction $D_A$. The section view of the bleed valve 20 of FIG. 3 is embodied in a plane comprising the axial direction $D_A$ and the radial direction $D_R$.

The perforated plate 23 comprises an upstream face 232 receiving the gas flow F and a downstream face 234 opposite the upstream face 232 through which the gas flow F escapes after traversing the perforated plate 23.

The duct 21 is only partially obstructed by the grid 22 in the sense that the flow F can flow through the orifices 230 of the perforated plate 23 forming the grid 22, and only through these orifices 23.

The perforated plate 23 of the grid 22 may be made of a metallic material or of a ceramic matrix material or another material resistant to thermal conditions, in particular when the bleed valve 20 is operational.

The grid 22 can be mounted at an outlet end of the duct 21 or else inside the duct 21 as indicated by the portion of the duct 21 in dotted lines.

Furthermore, as indicated in FIG. 3, the grid 22 further comprises a layer of porous material 24 disposed on the downstream face 234 without covering the orifices 230. The plate 23 and the layer of porous material 24 thus form channels from the orifices 230 of the perforated plate 23.

The perforated plate 23 comprises a thickness h between 1 mm and 20 mm, and the layer of porous material 24 comprises a thickness he.

FIG. 4 illustrates a front view of the perforated plate 23 of FIG. 3 according to a first embodiment. The perforated plate 23 extends in a radial plane comprising the radial direction $D_R$ and orthogonal to the axial direction $D_A$.

In a variant, the perforated plate 23 can convex along the axial direction $D_A$. In another variant, the plate 23 can be disposed inside the duct in such a way as to form an angle between 0 and 10° with a plane orthogonal to the axial direction $D_A$, the orifices 230 extending along the axial direction $D_A$ which makes it possible to slightly elongate the length of the channel formed by the orifice 230 with a reduced thickness h of the plate 23.

As illustrated in FIG. 4, the perforated plate 23 comprises, in this example, 37 orifices 230 each having the shape of a circle with a second diameter D between 0.5 mm and 20 mm and a geometrical center C.

The thickness he of the layer of porous material 24 is contained between a half second diameter D of the orifice 230 and twenty times the first diameter De of the duct 21, which corresponds to the diameter of the perforated plate 23 when the grid is mounted inside the duct 21.

Each orifice 230 is separated from the other adjacent orifices by a length e between 1.1 times and 6 times the second diameter D of the orifice. The term "adjacent orifices" should be understood to mean two orifices not having any other orifices between them. The length e separating the two orifices is measured from the center of the first orifice to the center of the second orifice.

FIG. 5 illustrates a section view of a bleed valve 20 according to a second embodiment of the invention.

The second embodiment differs from the first embodiment illustrated in FIG. 3 and in that the duct 21 comprises a duct portion 210 located downstream of the grid 22 with respect to the direction of the gas flow F, this duct portion 210 being fitted with an acoustic treatment panel 25. In a variant, the acoustic treatment panel could be replaced by a layer of porous material.

The acoustic treatment panel 25 comprises a core having a honeycomb structure forming resonant acoustic absorption cavities. The cavities are tuned over a range of frequencies to be treated.

The acoustic treatment panel 25 extends along the wall of the duct portion 210, i.e. along the axial direction $D_A$, over a length Lm between an upstream end 251 and a downstream end 252 with respect to the direction of the gas flow F. The length Lm is between a first length equal to half the first diameter De of the duct 21 and a second length equal to fifty times the first diameter De of the duct 21.

The upstream end 251 of the acoustic treatment panel 25 is separated from the grid 22 by a length Sm along the axial direction $D_A$ less than or equal to forty times the first diameter De of the duct 21.

The acoustic treatment panel 25 further comprises a thickness hm along the radial direction $D_R$ between a first thickness equal to half of the second diameter D of a orifice 230 of the perforated plate 23 and a second thickness equal to twenty times the first diameter De of the duct 21.

FIG. 6 shows a front view of a perforated plate 23 of the acoustic treatment grid 22 according to a third embodiment of the acoustic treatment grid.

In this third embodiment, the perforated plate 23 comprises 22 orifices 230 distributed over a single half 231 of the disk formed by the perforated plate 23.

FIG. 7 shows a front view of a perforated plate 23 of the acoustic treatment grid 22 according to a fourth embodiment of the acoustic treatment grid.

In this fourth embodiment, the perforated plate 23 comprises 30 orifices 230 distributed over a ring 233 formed between the outer perimeter of the circular perforated plate 23 and an inner circle Ci of a diameter smaller than that of the outer perimeter.

FIG. 8 shows a front view of a perforated plate 23 of the acoustic treatment grid 22 according to a fifth embodiment of the acoustic treatment grid.

In this fifth embodiment, the perforated plate 23 comprises 32 orifices 230 distributed over the perforated surface to form first areas 235 without orifices and second areas 236 provided with orifices 230.

FIG. 9 shows a front view of a perforated plate 23 of the acoustic treatment grid 22 according to a ninth embodiment of the acoustic treatment grid.

In this sixth embodiment, the perforated plate 23 comprises 36 orifices 230 distributed over the entire surface of the perforated plate 23 as in the first embodiment illustrated in FIG. 4. The sixth embodiment differs from the first embodiment illustrated in FIG. 4 in that the orifices 230 comprise orifices of different diameters, the diameter of the orifices 230 increasing from a first embodiment 237 of the circular perforated plate 23 to a second end 238 of the circular perforated plate 23.

FIG. 10 shows a front view of a perforated plate 23 of the acoustic treatment grid 22 according to a seventh embodiment of the acoustic treatment grid.

The seventh embodiment differs from the sixth embodiment illustrated in FIG. 9 and in that the diameter of the orifices 230 increases as it gets further from the center of the circular perforated plate 23.

FIG. 11 shows a front view of a perforated plate 23 of the acoustic treatment grid 22 according to an eighth embodiment of the acoustic treatment grid.

The eighth embodiment differs from the sixth embodiment illustrated in FIG. 9 in that the diameter of the orifices 230 increases as it gets closer to the center of the circular perforated plate 23.

FIG. 12 schematically illustrates a view of a bleed valve according to a third embodiment of the bleed valve.

In the third embodiment of the bleed valve 20, the duct 21 comprises a single inlet 211, a first outlet 212, a second outlet 213, a fork 214, a first segment 215 extending between the inlet 211 of the duct 21 and the fork 214, a second segment 216 extending between the fork 214 and the first outlet 212, and a third segment 217 extending between the fork 214 and the second outlet 213.

In the third embodiment, the bleed valve 20 comprises a grid 22 mounted in the first segment 215, as well as a first acoustic treatment panel 25a mounted on the first segment 215, between the grid 22 and the fork 214, and a second acoustic treatment panel 25b mounted on third section 217 between the fork 214 and the second outlet 213.

The first acoustic treatment panel 25a extends over a first length Lm1 of the first segment 215 and is separated from the grid 22 by a first space of length Sm1, and the second acoustic treatment panel 25b extends over a second length Lm2 of the third segment 217 and is separated from the grid 22 by a second space of length Sm2.

FIG. 13 schematically illustrates a view of a bleed valve according to a fourth embodiment of the bleed valve.

The fourth embodiment of the bleed valve 20 differs from the third embodiment illustrated in FIG. 12 in that it comprises two grids 22a and 22b and two acoustic treatment panels 25a and 25b, the first grid 22a and the first acoustic treatment panel being mounted on the second segment 216 of the duct 21 and the second grid 22b and the second acoustic treatment panel being mounted on the third segment 217 of the duct 21.

The first acoustic treatment panel 25a extends over a first length Lm1 of the second segment 216 and is separated from the first grid 22a by a first space of length Sm1, and the second acoustic treatment panel 25b extends over a second length Lm2 of the third segment 217 and is separated from the second grid 22b by a second space of length Sm2.

The grid and the bleed valve according to the invention make it possible to optimize the mixing downstream of the grid and thus to minimize the intensity of the aero-acoustic phenomena generated by this type of bleed system and specifically to reduce mixing noise and shock noise, while providing a perforated plate making it possible to ensure the operability of the air system.

The invention claimed is:

1. An acoustic treatment grid mounted inside or at an outlet of a duct of a bleed valve of a turbomachine of an aircraft to convey a gas flow, the grid comprising a perforated plate and circular orifices traversing the perforated plate along a first direction, the orifices having a diameter and a geometrical center, wherein each orifice is separated from an adjacent orifice by a space, a length of which is equal to the product of the diameter of said orifice and a spacing coefficient of a value between 1.1 and 6 to minimize noise, while ensuring an operability of the bleed valve, wherein the perforated plate comprises, with respect to the gas flow intended to traverse the perforated plate, an upstream face intended to receive the gas flow and a downstream face, opposite the upstream face, from which the gas flow is intended to escape, the grid further comprising a layer of porous material disposed on said downstream face of the perforated plate without covering the orifices of the perforated plate.

2. The grid as claimed in claim 1, wherein the diameter of the orifices of the perforated plate is between 0.5 mm and 20 mm.

3. The grid as claimed in claim 1, wherein the perforated plate has a thickness along the first direction between 1 mm and 20 mm.

4. The grid as claimed in claim 1, wherein the layer of porous material disposed on said downstream face of the perforated plate includes a thickness along the first direction between a first thickness equal to half the diameter of an orifice around which the layer of porous material is disposed and a second thickness equal to twenty times the greatest length of the perforated plate measured in a plane orthogonal to the first direction.

5. The grid as claimed in claim 1, wherein the perforated plate comprises between 2 and 500 orifices.

6. The grid as claimed in claim 1, wherein the orifices are uniformly distributed over the perforated plate.

7. The grid as claimed in claim 1, wherein the perforated plate comprises at least a first orifice with a first diameter and at least a second orifice with a second diameter different from the first diameter.

8. A bleed valve for an aircraft turbojet engine comprising a duct to convey a gas flow mainly along a first direction from at least one inlet of the duct to at least one outlet of the duct, and at least one grid as claimed in claim 1 mounted inside the duct or on an outlet of the duct.

9. The bleed valve as claimed in claim 8, wherein the duct comprises at least one segment, the diameter of which varies along the first direction.

10. The bleed valve as claimed in claim 8, wherein the duct comprises at least one segment in which the geometrical shape of the section of the duct varies, the section of the duct extending orthogonally to the first direction.

11. The bleed valve as claimed in claim 8, wherein the conduit comprises at least two outlets, at least a fork, at least a first segment extending between the inlet of the duct and a fork, a second segment extending between a fork and a first outlet, a third segment extending between a fork and a second outlet, at least one of said at least one grid being mounted in one of the first, second or third segment, or on one of the first or second outlets.

12. A turbojet engine comprising a nacelle, an intermediate casing and an inner casing, coaxial, and a bleed valve as claimed in claim 8, the intermediate casing and the inner casing together delimiting a primary fluid flow path, the nacelle and the intermediate casing together delimiting a secondary fluid flow path, and the bleed valve being mounted between the primary flow path and the secondary flow path and configured to draw a portion of the air from the primary flow path and deliver it into the secondary air path.

13. A turbojet engine comprising a nacelle, an intermediate casing and an inner casing, coaxial, and a bleed valve as claimed in claim 8, the intermediate casing and the inner casing together delimiting a primary fluid flow path in which is mounted a combustion chamber, the nacelle and the intermediate casing together delimiting a secondary fluid flow path, and the bleed valve being configured to draw a portion of the air from the primary flow path upstream of the combustion chamber and deliver the air into the primary flow path downstream of the combustion chamber.

14. The bleed valve as claimed in claim 8, wherein the duct comprises at least one wall equipped with an acoustic treatment means and located downstream of the grid with respect to the direction of flow of the gas flow conveyed through the duct.

15. The bleed valve as claimed in claim 14, wherein the acoustic treatment means of said at least one wall comprises a layer of porous material and/or an acoustic treatment panel.

16. The bleed valve as claimed in claim 14, wherein a shortest distance between the acoustic treatment means and the grid is less than or equal to a length equal to forty times the greatest length of a section of the duct, the section of the duct extending orthogonally to the first direction.

17. The bleed valve as claimed in claim 14, wherein a length along the first direction of the acoustic treatment means is between a first length equal to half a greatest length of a section of the duct and a second length equal to fifty times the greatest length of the section of the duct, the section of the duct extending orthogonally to the first direction.

18. The bleed valve as claimed in claim 14, wherein the thickness along a direction orthogonal to the first direction of the acoustic treatment means is between a first thickness equal to half a diameter of an orifice of the perforated plate and a second thickness equal to twenty times the greatest length of the section of the duct, the section of the duct extending orthogonally to the first direction.

19. The bleed valve as claimed in claim 14, wherein said at least one grid and/or said at least one acoustic treatment means are made of ceramic material.

20. The bleed valve as claimed in claim 14, wherein the acoustic treatment means of said at least one wall comprises a honeycomb structure.

* * * * *